May 24, 1966  W. A. CLARKE  3,252,633
BEER DISPENSER

Filed Sept. 23, 1964  3 Sheets-Sheet 1

Inventor
W. A. CLARKE
By
Holcombe, Wetherill & Brisebois
Attorneys

United States Patent Office 3,252,633
Patented May 24, 1966

3,252,633
BEER DISPENSER
William Arthur Clarke, Hutton, England, assignor to Whitbread and Company Limited
Filed Sept. 23, 1964, Ser. No. 398,621
Claims priority, application Great Britain, Sept. 30, 1963, 38,456/63
8 Claims. (Cl. 222—482)

When very lively and highly carbonated beers are dispensed from metal kegs by the application to them of a carbon dioxide top pressure, there is a tendency for undue fobbing to take place as the beer issues from the nozzle through the dispensing valve. This is very undesirable as it makes it extremely difficult to fill glasses satisfactorily to the required level with the beer and the aim of the present invention is to provide a valve by which the fobbing of such beer can be controlled.

According to this invention, a beer dispenser comprises a housing containing an inlet chamber with a beer inlet passage, a gas vent fitted with a venting valve leading from its top and an outlet passage fitted with an adjustable restrictor leading from its bottom to an outlet valve seating which is provided with a valve closure member having a hand-operated opening mechanism which, upon operation to move the closure member away from its seat, also moves the restrictor to adjust the area of the outlet passage and so controls the flow and pressure drop of the beer through the outlet passage and past the seating, the area of the outlet passage increasing as the closure member is moved further from its seating.

The inlet chamber is arranged so that any gas which is expelled from the beer as it enters the chamber rises to the top of the chamber whence it can be drawn off through the venting valve, and from it the liquid beer with its dissolved carbon dioxide passes into the outlet passage. The flow through this passage is carefully controlled, as the beer is actually drawn off, by adjusting the hand-operated opening mechanism, which preferably includes a handle which is pulled by the operator. It has been found possible by means of this arrangement to keep the carbon dioxide mainly in solution in the beer by the proper adjustment of the pressure drop through the passage so that a glass can be filled with beer from the outlet from the valve with only the required comparatively small head upon it.

The outlet passage preferably has a shallow taper from its inlet end towards the seating and the restrictor also tapers and fits in the outlet passage. The restrictor is then moved axially towards the wider, inlet end of the outlet passage as the closure member is moved away from its seating. This happens as the valve closure member is opened and to enable the restrictor to be moved in this way, it may be directly fixed to, or integral with, the valve closure member so that the closure member and the restrictor both open and close together. Preferably however to simplify the dismantling of the valve which is very essential for cleaning purposes, the restrictor may be made separately from the valve closure member and be located immediately above the closure member which is itself movable upwards from its seat from the closed into the open position. Then, the restrictor is moved by the movement of the closure member from its seat to increase the area of the outlet passage and moves back again under the pressure of the beer within the inlet chamber as the closure member moves downwards below it back onto its seating when the valve is closed.

As the tapered restrictor moves towards the wider end of the outlet passage a clearance is formed between it and the wall of the passage. This clearance provides an elongated annular space through which the beer flows from the inlet chamber to the seating with a streamlined flow and a very gradual pressure drop occurs from the pressure which exists in the inlet chamber, and is just a little less than the top pressure applied to the keg, to atmospheric pressure at the outlet from the valve. As the valve closure member is moved further from its seating and in consequence the restrictor is moved further towards the wider end of the outlet passage, the width of the elongated annular space increases and the pressure drop becomes more sudden and the flow through the valve becomes greater.

The tapering passage and the restrictor which is fitted in it are preferably both of truncated conical shape and have an angle of conicity of between 6° and 10°. It has been found that for the best results, the restrictor should have a length between 1½ and 4 times, and preferably about twice, its maximum diameter.

The volume and shape of the inlet chamber are also of importance, but they are dependent to some extent upon the exact nature of the beer which is to be dispensed. For dispensing a highly conditioned draught stout, it has been found that the chamber should be circular and coaxial with the outlet passage and should have a diameter substantially larger than the wider upper end of the outlet passage and should have a height about equal to the length of the restrictor.

To assist in preventing bubbles of gas which pass into the inlet chamber from getting carried with the beer down through the outlet passage, the inlet passage is preferably directed upwards into the chamber beside the upper end of the outlet passage. As the beer is directed upwards into the chamber, any free gas is also directed upwards and tends to remain in the top of the chamber where it is subsequently drawn off through the venting valve, and the beer flows down again through the outlet passage.

The chamber may be made of transparent or translucent material so that the operator can seen how much of the space in the chamber is filled with gas and when this part of the space becomes substantial, the venting valve is opened manually to allow the gas to escape so that the chamber is again entirely filled with liquid beer. The venting valve may be operated by the same handle which operates the mechanism for opening the closure member and, when this is done, the mechanism is arranged so that movement of the handle from a closed position in one direction opens the closure member and also moves the restrictor towards the wide end of the outlet passage and movement of the handle in an opposite direction opens the venting valve.

An example of a valve constructed in accordance with the invention is illustrated in the accompanying drawings in which.

Figure 1:
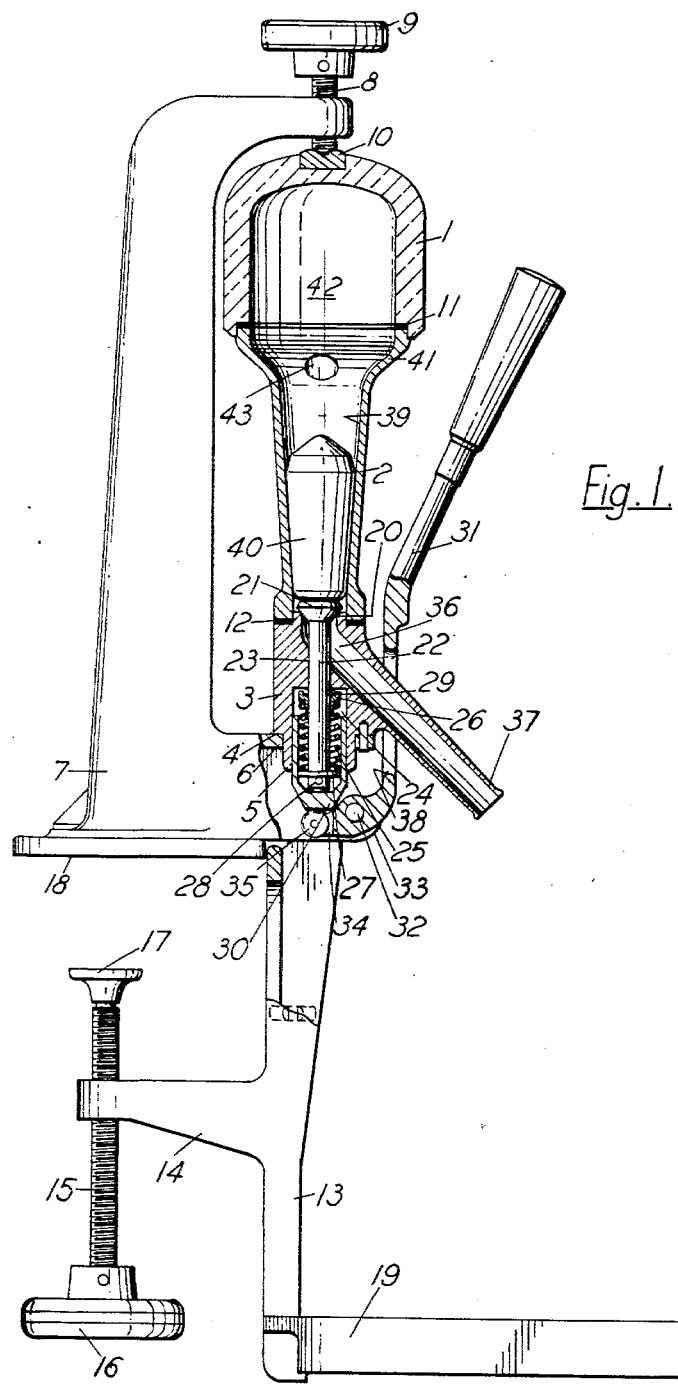
FIGURE 1 is a side view of the dispenser with parts shown in section on the vertical centre line.
Figure 2:
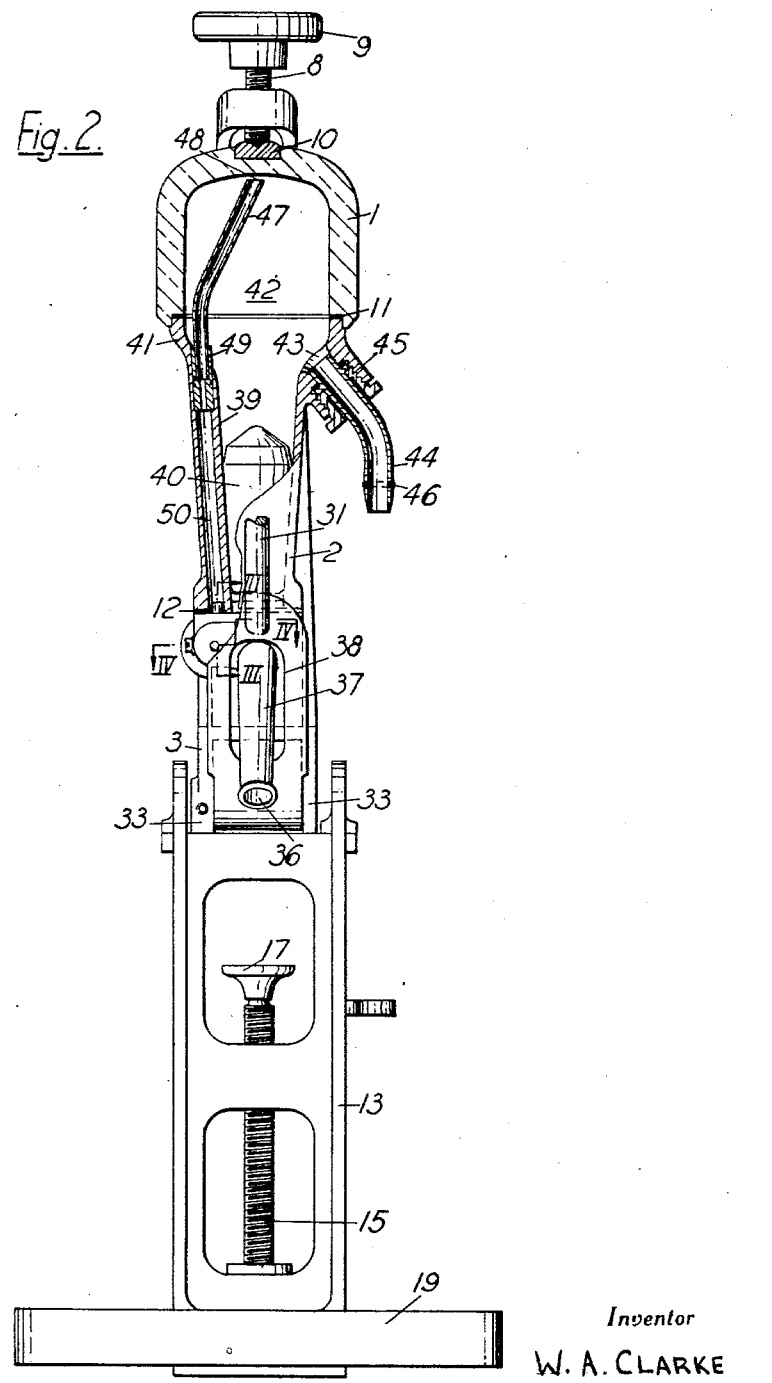
FIGURE 2 is a front elevation of the dispenser with parts broken away and shown in section to illustrate the internal details.

The valve has a circular housing formed in three sections, namely a top circular bell-shaped section 1, made of transparent plastics material, a middle section 2 which is a metal die casting and a bottom section 3 which is another metal die casting. The section 3 has an annular shoulder 4 with a section 5 of reduced diameter below it and this section fits in a hole 6 in a bracket 7. The bracket 7 forms a G-clamp and has a screw 8 fitted with a knob 9 at its upper end. The bottom end of the screw 8 engages with a metal insert 10 in the top section 1 of the housing and tightening of the screw 8 by means of the knob 9 clamps all three sections 1 to 3 together. The joint between the sections 1 and 2 is sealed by a rubber sealing ring 11 and the joint between the sections 2 and 3 is sealed by a second ring 12.

At the bottom of the bracket 7 is a leg 13 with a bar 14 projecting from it. The bar 14 has a tapped hole receiving a clamping screw 15 having a knob 16 at one end and a pad 17 at the other end. This part of the bracket 7 forms a second G-clamp which enables the whole valve to be fixed in position on a bar counter, a part of the flat top of the counter being clamped in between a flat surface 18 and the pad 17 by tightening the screw 15. Projecting from the bottom of the leg 13 is a shelf 19 for receiving a glass or mug to be filled with beer.

At the top of the bottom section 3 of the housing is an annular valve seating 20 on which a mushroom-headed valve closure member 21 rests. The closure member has a stem 22 which passes downwards through a bore 23 in the section 3. The lower end of the stem 22 lies within a recess 24 and is surrounded by a coiled compression spring 25 which acts between a collar 26 and a washer 27 held on the stem 22 by a cross pin 28. The reaction of the spring on the washer 27 is transmitted through the stem 22 and holds the closure member 21 on its seat 20. The clearance between the stem 22 and the bore 23 through which it closes is sealed by a rubber O-ring 29 which is held between the collar 26 and the inner end of the recess 24. A cap 30 slides in the recess 24 and covers the lower end of the valve shank 22.

A valve operating handle 31 is pivotally mounted on a pin 32 which is fixed between a pair of lugs 33 fixed to the bracket 7. The handle 31 forms one arm of a two-armed lever the other arm 34 of which extends below the bottom of the cap 30. This arm carries a roller 35 which engages with the bottom of the cap 30. By pulling the handle 31 downwards and towards the right and thus rocking it in a clockwise direction as shown in FIGURE 1 about its pivot pin 32, the roller 35 is pushed upwards and this pushes the cap 30 and with it the valve closure member 21 upwards to open the valve.

Below the valve seat 20, the section 3 of the housing is formed with an outlet passage 36 extending through a spout 37. The spout 37 passes through an opening 38 formed in the handle 31.

The middle section 2 of the housing has in its lower part a tapering conical outlet passage 39 in which a truncated conical restrictor 40 fits. When the closure member 21 is closed and is on its seating 20, the top of the closure member 21 is just clear of the bottom of the restrictor 40 so that the restrictor 40 is free to move downwards until it fits in and completely closes the outlet passage 39. After the valve closure member has moved upwards a short distance off its seat sufficient to take up the clearance between it and the bottom of the restrictor 40, it moves the restrictor 40 up with it causing the restrictor to move into a wider part of the passage 39 so that there is an annular clearance around it. The top of the section 2 of the housing widens out at 41 and forms the bottom part of an inlet chamber 42. An inlet passage 43 extends through the wall of the widened out part 41 and has an inlet pipe 44 connected to it by a union 45. The inlet pipe 44 forms a spigot over which a flexible beer inlet pipe (not shown) can be pushed. The joint between the flexible pipe and the pipe 44 is sealed by an O-ring 46.

Figure 3:
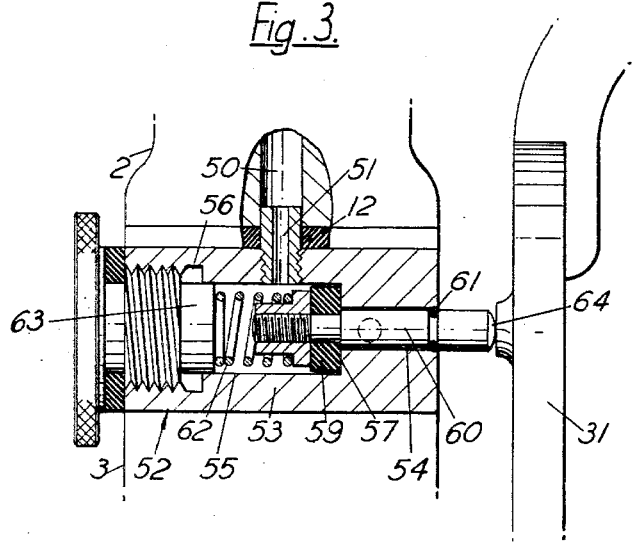
FIGURE 3 is a sectional detail to a larger scale as seen in the direction of the arrows on the line III—III in FIGURE 2; and, FIGURE 4 is a section of the part shown in FIGURE 3 as seen in the direction of the arrows on the line IV—IV in FIGURE 2.
Figure 4:
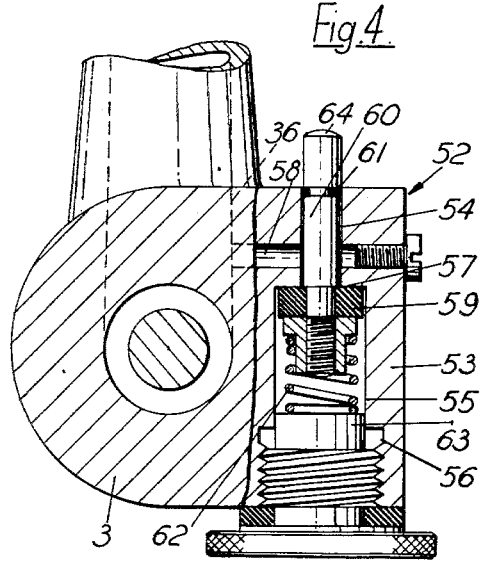

The top section 1 of the housing contains the upper part of the inlet chamber 42 and within this is a gas venting pipe 47 having an open upper end 48. The pipe 47 leads downwards through a coupling 49 to a gas venting duct 50 formed in the wall of the section 2. The duct 50 in turn communicates with a port 51 formed in the bottom section 3 of the housing and the duct 51 communicates with a gas venting valve 52 which is shown in detail in FIGURES 3 and 4 of the drawings.

The gas venting valve 52 has a body 53 which is an integral part of the bottom section 3 of the housing and this body has an axial bore extending through it having three sections 54, 55 and 56 of increasing diameters. The duct 51 leads into the middle part 55 of the bore and a shoulder 57 formed between the middle section 55 and the smallest section 54 of the bore forms a valve seat. A second port 58 leads from the smallest part 54 of the bore through the body 53 into the passage 36 at the upper end of the spout 37. A poppet valve 59 has a stem 60 which slides in the smallest part 54 of the bore and is sealed in the bore by a rubber O-ring 61. The poppet valve 59 is normally held on the seating 57 by means of a spring 62 which lies within the section 55 of the bore and acts between the valve 59 and a screw threaded plug 63 which is screwed into and closes the section 56 of the bore.

The tip 64 of the valve stem 60 lies just behind the rear face of the handle 31 when the handle is in its normal rest position shown in FIGURE 1 of the drawings. By pressing the handle upwards and towards the left, it pushes the stem 60 inwards against the action of the spring 62 and moves the valve 59 off its seat. This allows the port 51 to communicate with the port 58 through the small clearance around the stem 60 within the smallest part 54 of the bore. Thus communication is established between the open end 48 of the pipe 47 and the spout 37 and this allows any gas which may collect within the upper part of the chamber 42 to be discharged. Thus, to operate the valve, it is only necessary either to pull the handle 31 downwards to cause beer to be discharged, its rate of flow and head being controlled by the amount by which the handle 31 is pulled downwards and in consequence the amount by which the restrictor 40 is moved upwards in the discharge passage 39 and then, at times, when the operator sees through the transparent shell 1 that a substantial quantity of gas which has been thrown out of the solution has collected in the chamber 42, to push the handle 31 upwards until this gas has been discharged.

It is important from a hygiene point of view that the whole valve should be kept extremely clean and for this purpose it can very easily be entirely dismantled merely by unscrewing the clamping screw 8 by means of the knob 9. The sections 1, 2 and 3 of the housing can then be removed and washed out and the restrictor 40 can be removed from the passage 39. Re-assembly of the valve is equally simple.

I claim:

1. A beer dispenser comprising a housing defining an inlet chamber, means defining a beer inlet passage communicating with said chamber, means defining a gas venting passage leading from the top of said chamber, a hand-operated gas venting valve normally closing said gas venting passage, means defining an outlet passage leading downwards from the bottom of said chamber, an adjustable restrictor member movably mounted in said outlet passage, an outlet valve seating at the end of said outlet passage remote from said chamber, a valve closure member normally seated on said seating and a hand-operated opening mechanism operative to move said closure member away from said seat and to move said restrictor member upwards in said outlet passage to increase the area of said outlet passage around said restrictor member and thus to control the flow and pressure drop of said beer through said outlet passage and past said seating, said area of said outlet passage increasing as said closure member is moved further from said seating.

2. A beer dispenser according to claim 1, in which the outlet passage has a shallow taper from its inlet towards the seating and the restrictor also tapers and fits in the outlet passage, the restrictor being moved axially towards the wider end of the outlet passage as the closure member is moved away from its seating.

3. A beer dispenser according to claim 1, in which both the outlet passage and the restrictor are of truncated conical shape and have an angle of conicity between 6° and 10°.

4. A beer dispenser according to claim 3, in which the restrictor has a length between 1½ and 4 times its maximum diameter.

5. A beer dispenser according to claim 4, in which the restrictor has a length of substantially twice its maximum diameter.

6. A beer dispenser according to claim 3, in which the chamber is circular and coaxial with the outlet passage and has a diameter substantially larger than that of the wider end of the outlet passage and a height substantially equal to the length of the restrictor.

7. A beer dispenser according to claim 6, in which the inlet passage is directed upwards into the chamber beside the upper end of the outlet passage.

8. A beer dispenser according to claim 1, in which the hand-operated opening mechanism is actuated by a pivoted handle and the venting valve has an operating member adjacent the handle, the handle and operating member being arranged so that movement of the handle in one direction moves the closure member from its seat and moves the restrictor and movement of the handle in an opposite direction opens the venting valve.

References Cited by the Examiner

UNITED STATES PATENTS 2,363,747 11/1944 Reece et al. _____ 222—442 X
2,372,081 3/1945 Haldane _____ 222—482 X LOUIS J. DEMBO, *Primary Examiner.*